United States Patent [19]  [11] 3,896,249
Keeling et al.  [45] July 22, 1975

[54] SELF-ADHESIVE TRANSFERS

[75] Inventors: Robert Alan Keeling; John Garrick Priest, both of London, England

[73] Assignee: Johnson, Matthey & Co. Limited, London, England

[22] Filed: Apr. 4, 1973

[21] Appl. No.: 347,629

Related U.S. Application Data

[63] Continuation of Ser. No. 175,705, Aug. 27, 1971, abandoned, which is a continuation of Ser. No. 791,091, Jan. 14, 1969, abandoned.

[52] U.S. Cl. .............. 428/202; 427/152; 428/352; 428/354; 428/914
[51] Int. Cl.² ..................... B32B 3/00; B32B 7/06
[58] Field of Search .......................... 117/3.1–3.6, 117/76 F, 76 P, 76 T, 218; 161/146, 406

[56] References Cited
UNITED STATES PATENTS

| | | | |
|---|---|---|---|
| 2,351,933 | 6/1944 | Decker | 156/240 X |
| 3,007,829 | 11/1961 | Akkeron | 117/3.2 X |
| 3,152,940 | 10/1964 | Abel et al. | 117/1 |
| 3,230,289 | 1/1966 | Eder et al. | 117/76 X |
| 3,235,395 | 2/1966 | Scharf | 117/3.1 |
| 3,276,933 | 10/1966 | Brant | 117/3.1 X |
| 3,298,850 | 1/1967 | Reed et al. | 117/3.1 |
| 3,409,464 | 11/1968 | Shiozawa | 117/217 X |
| 3,432,333 | 3/1969 | Hurst | 117/76 X |
| 3,475,213 | 10/1969 | Stow | 117/68.5 X |

FOREIGN PATENTS OR APPLICATIONS 771,595  11/1967  Canada .................. 117/3.1

Primary Examiner—William D. Martin
Assistant Examiner—Dennis C. Konopacki
Attorney, Agent, or Firm—Burns, Doane, Swecker & Mathis

[57] ABSTRACT

Self-adhesive transfers according to the present invention are suitable for the application of decorative designs to heat resistant bases such as pottery, glass and metal. The design consists essentially of a backing sheet, a release layer on at least a part of each surface of the backing sheet, a design layer applied to one release layer and including one or more layers of printing ink formulations and a layer of high tack pressure sensitive adhesive applied to the design layer. The release layers are preferably made from polysiloxane materials. The printing ink formulations may contain pigments where it is required to use the transfer for decorative purposes or conductive, resistive, insulating, dielectric or semi-conductive materials where it is required to use the transfers for making electrical components. A plurality of transfers may be stacked with the high tack pressure sensitive adhesive layers uppermost. The release layer of the adjacent transfer in contact therewith offers a relatively small surface area, thereby permitting easy removal of transfers from the stack.

33 Claims, 1 Drawing Figure

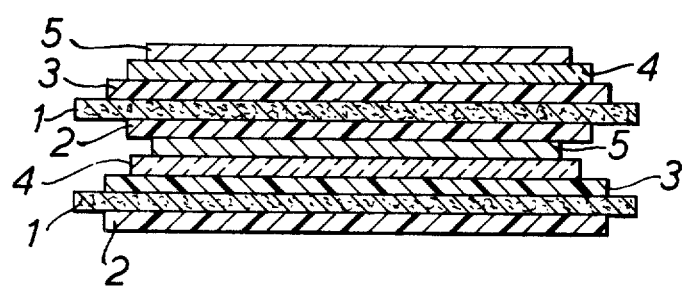

SELF-ADHESIVE TRANSFERS

CROSS-REFERENCES TO RELATED APPLICATIONS

This is a continuation, of application Ser. No. 175,705, filed Aug. 27, 1971, now abandoned which application is in turn a continuation of application Ser. No. 791,091, filed Jan. 14, 1969 now abandoned.

BRIEF SUMMARY OF THE INVENTION

This invention relates to self-adhesive transfers for the application of decorative and other designs to among other things heat resistant bases such as pottery, glass, metal and the like.

Self-adhesive transfers are well known in the art but they suffer from certain disadvantages. In general, such transfers incorporate low tack pressure-sensitive adhesives which require substantial pressure to cause adhesion to the receptor surface of a heat resistant base. These transfers cannot be applied satisfactorily to irregular surfaces or surfaces with complex curvatures.

One object of the present invention is to provide self-adhesive transfers for applying decorative and other designs to heat resistant bases which may be applied to said base under light pressure and which are sufficiently flexible to become affixed to bases having irregular surfaces or complex curvatures.

DETAILED DESCRIPTION

According to this invention a self-adhesive transfer for applying a design to a base comprises a backing sheet, a release layer on at least a part of each surface of the backing sheet, a design layer applied to one release layer and including one or more layers of printing ink formulations and a layer of high tack pressure-sensitive adhesive applied to said design layer.
said transfer being adapted to be stacked with the adhesive layer in contact with the less smooth release layer of an adjacent transfer, said adhesive layer having a lower adhesion to the less smooth release layer than the adhesion of the smoother release layer to said design layer, thereby reducing blocking and rendering adjacent transfers separable.

The release layers, disposed one on each surface of the backing sheet, may possess differing release properties and, preferably, the release layers are made from polysiloxane materials. Polysiloxane materials have a general formula $(R_2SiO)_n$ where n is a positive integer and R is a methyl group in the simplest case. However, if desired, one or more of the methyl groups may be replaced by other alkyl groups. Further, monomeric polysiloxane materials may be modified according to the substituents employed to form a cross linked molecule resulting in a two or three dimensional polymer.

The release properties of a release layer are primarily dependent upon two factors, namely, the composition of the release layer — a chemical factor — and the relative smoothness (or roughness) of the surfaces of the backing sheet to which the release layer is applied — a mechanical factor. Thus, for a release layer having a particular chemical composition, the release properties are dependent on the mechanical factor. For example, the degree of adhesion or mechanical bonding between a relatively smooth surface and a film, an ink or an adhesive is relatively small resulting in good release properties. On the other hand if the same film, ink or an adhesive is applied to a less smooth surface, for example, a coarse grained surface, a relatively good mechanical bonding occurs.

The thickness of the release layers is usually such that the contour or finish of the surface of the release layer is closely followed or reflected in the finish or contour of the backing sheet. Thus, where a release layer is applied to a backing sheet having a smooth surface, the surface of the release layer is also smooth and, where the backing sheet has a rough or coarse grain surface, the surface of the release layer will likewise have a rough or coarse grain surface. This concept of the finish or contour of the surface of the backing sheet being reflected in the finish or contour of the release layer is utilised in the present invention to reduce the tendency of a stack of transfers to so-called "blocking," that is, adjacent transfers in a stack sticking together.

In order that the invention may be better understood, reference will now be made to the single FIGURE of drawings which shows an enlarged cross-sectional view of a stack of two complete transfers.

According to a feature of this invention referring to the to the single FIGURE of drawing, the surface of the backing sheet 1 which carries a release layer 3, the design layer 4 and the layer of high tack pressure sensitive adhesive 5, is smoother than that surface of the backing sheet which carries a single release layer 2. Thus, assuming that the transfers in a stack are positioned with the high tack pressure sensitive adhesive layers 5 uppermost, (which is usually the case), the second mentioned or single release layer 2 will offer a relatively smaller surface area of contact to the high tack pressure sensitive adhesive layer 5 of the next transfer in the stack thereby permitting easy removal of transfers from the stack. We have found that a backing sheet having a peel force of not greater than 3 grams per linear inch is suitable for that side which carries a release layer, design layer and high tack pressure sensitive adhesive layer, and that a peel force of not greater than 15 grams per linear inch is suitable for the reverse surface which carries the single release layer.

The backing sheet may be in sheet or strip form and may comprise one or more layers of flexible material. Suitable materials include:- i. a low to medium density polyethylene, having a density of, for example 0.92 – 0.935 gm/cm³;
ii. a paper/polyethylene laminate;
iii. a polyethylene/paper/polyethylene laminate;
iv. polyethylene,
v. paper, and
vi. a flexible sheet material.

One backing sheet/release layer combination which we have found particularly suitable is marketed by the Inveresk Paper Company of London Eng., and comprising a layer of polyethylene coated on each surface thereof with a layer of polysiloxane material.

The design layer may be applied to the backing by a screen process gravure, letter-press, dry-offset, flexographic or lithographic printing process, or any combination thereof. The layer of adhesive may be applied as an overall coating by any normal coating technique or it may be related to the decorative or other design area by printing the adhesive thereon by the screen, or gravure, or flexographic printing process.

The transfer so produced may be applied to heat resistant or other bases such as tins, bottles, plastic containers and the like either manually or automatically in die-cut form or from the web, that is to say with the backing sheet or film in the form of a strip or band. On applying such a transfer, the high tack adhesive coating bonds to the heat resistant base. Due to the low bond strength between the adhesive/design layers and the backing substrate, produced by a combination of ink formulations and of surface characteristics of the backing substrate, the latter can be easily removed, leaving the decorative or other design firmly affixed to the heat resistant base. In the case where inks are used with polyethylene films, the ink layer must, itself, be sufficiently flexible to allow application of the design to surfaces of complex curvature. The construction of transfers according to this invention may also be used in the construction of self-adhesive labels.

The printing ink for the decorative or other design may be based on a variety of materials such as nitrocellulose and cellulose esters: modified rosin, alkyds, cyclic ketone condensates, maleics, amine and acrylic resins.

Preferably acrylic resins are used and it is desirable to incorporate in the ink medium a plasticiser and surface active agents for producing the desired film-forming and release properties.

A typical ink formulation based on an acrylic resin is:-

| | |
|---|---|
| Pigment | 60.0% |
| Acrylic Resin | 14.5% |
| Solvent | 22.0% |
| Plasticiser | 1.5% |
| Surfactant | 2.0% |
| | 100% |

The colouring material used may, depending on the purpose of the heat resistant base, be composed of inorganic pigment with a proportion of a vitreous material as is well known to the art, or on the other hand, where the heat resistant base is not subject to very high temperatures, a heat stable organic pigment may be incorporated.

By way of example, a flux or glass matrix could be composed of lead silicate, lead borosilicate or lead alkali borosilicate with minor amounts of modifying oxides with the addition of known inorganic colouring compositions such as cobalt aluminate, cobalt silicates, cadmium sulpho-selenides and lead antimonate. Organic pigments could also be used, providing they are lightfast and are heat stable up to at least 200°C (for non-ceramic applicators). Typical pigments exhibiting these properties are iso-indolinone yellows(such as the isoindolinone yellow pigment sold under the designation Irgazin yellow 3 GLT by Geigy, Ltd.), oranges (such as the isoindolinone orange pigment sold under the designation Irgazin orange RLT by Geigy, Ltd. and known by the generic designation Colour Index Pigment Orange 42) and reds, dioxazine violets, phthalocyanine blues (such as the phthalocyanine blue pigment sold under the designation Irgalite blue BGL by Geigy, Ltd. and known by the generic designation Colour Index Pigment Blue 15; C.I. No. 74160) and greens. Examples of acrylic resins, solvents, plasticisers and surfactants are set out below:

Acrylic Resins.

Methyl methacrylate/butyl methacrylate copolymer, poly 2-ethyl hexyl acrylate and poly butyl methacrylate.

Solvents.

Esters such as amyl and butyl lactate, aromatic hydrocarbons, e.g. xylene, alcohols such as diacetone alcohol, glycol ether esters, for example 2-ethoxy ethanol acetate solvent, and others known to those skilled in the art may be used.

Plasticisers.

Di-octyl phthalate, di-butyl phthalate and butyl phthalyl butyl glycollate and other plasticisers known to those skilled in the art may be used.

Surfactants.

To achieve good film forming properties when printing onto silicone coatings it is necessary to include surfactants in the printing media. Suitable materials have been found to be stearic acid and its derivatives, glyceryl monostearate, and stearamide marketed as Armid HT by Armour Hess Chemicals.

Various examples of specific ink formulations containing inorganic and organic pigments are set out below:-

Ink formulations containing inorganic colours for use on ceramic articles.

| | | |
|---|---|---|
| 1. | Cadmium red ceramic enamel | 64.3% |
| | Polybutyl methacrylate | 14.2% |
| | Xylene | 8.4% |
| | Amyl lactate | 9.5% |
| | Di-octyl phthalate | 1.8% |
| | Armid HT stearamide | 1.8% |
| | | 100.0% |
| 2. | Lead antimony yellow ceramic enamel | 61.5% |
| | 2-ethyl hexyl acrylate | 16.0% |
| | Amyl lactate | 18.8% |
| | Butyl phthalyl butyl glycollate | 1.9% |
| | Stearic acid | 1.8% |
| | | 100.0% |
| 3. | Cobalt blue ceramic enamel | 67.3% |
| | Polybutyl methacrylate/methyl methacrylate copolymer | 13.5% |
| | Diacetone alcohol | 15.5% |
| | Di-butyl phthalate | 2.0% |
| | Glyceryl mono-stearate | 1.7% |
| | | 100.0% |

Ink formulations containing organic colours.

| | | |
|---|---|---|
| 4. | irgazin yellow 3 GLT iso-indolinone pigment | 18.0% |
| | Polybutyl methacrylate | 36.0% |
| | Xylene | 18.0% |
| | Amyl lactate | 24.0% |
| | Di-octyl phthalate | 1.0% |
| | Armid HT stearamide | 3.0% |
| | | 100.0% |
| 5. | Irgazin orange RLT iso-indolinone pigment | 15.00% |
| | 2-ethyl hexyl acrylate | 40.5% |
| | Amyl lactate | 40.5% |
| | Butyl phthalyl butyl glycollate | 1.5% |
| | Stearic acid | 2.5% |
| | | 100.0% |
| 6. | Irgalite blue BGL phthalacyanine pigment | 10.0% |
| | polybutyl methacrylate/methyl methacrylate copolymer | 43.5% |
| | Diacetone alcohol | 43.5% |
| | Di-butyl phthalate | 1.0% |
| | Glyceryl mono-stearate | 2.0% |
| | | 100.0% |

The most suitable pressure sensitive adhesive is one which, when fired, burns smoothly without passing through a melting stage. To this end, acrylics and acrylic-vinyl acetate copolymer based adhesives are the most satisfactory and it is necessary that the material selected is one which is internally plasticised and permanently tacky. A typical formula giving satisfactory results is:-

| Acrylic resin | 22.25% |
|---|---|
| Alcohol | 50.0% |
| Ethyl acetate | 23.15% |
| Hexane | 4.6% |
| | 100.0% |

Alternatively, where it is desirable to use an adhesive having a still higher tack, the following formula would be suitable:-

| Acrylic resin | 21.8 – | 20.5% |
|---|---|---|
| Sucrose acetate Iso butyrate | 2.0 – | 7.5% |
| Alcohol | 49.0 – | 46.25% |
| Ethyl acetate | 22.7 – | 21.5% |
| Hexane | 4.5 – | 4.25% |
| | 100% | 100% |

Examples of suitable and commercially available adhesives are Adhesive K. 7503 acrylic copolymer adhesive (Swift & Co. Ltd.), Howstik 255 acrylic copolymer adhesive W. E. Howlett & Sons Ltd.) and Gelva 263 acrylic-vinyl acetate copolymer adhesive (Monsanto). In practice these materials are modified with polymerised and hydrogenated rosins, rosin esters, chlorinated diphenyls and Sucrose acetate isobutyrate.

Examples of the modifying materials are: Polypale Resin polymerized rosin, Staybelite Ester 3 diethylene glycal of rosin from Hercules Powder and Sucrose acetate isobutyrate Eastman Kodak Chemicals.

The modifying materials are added in the proportion of 2 – 20 percent to achieve the desired properties of tack, cohesion and shelf life. Solvents and diluents are also added to the adhesive solution to achieve the desired rheological properties. The solvents and diluents are carefully selected so that they will not attack and penetrate the underlying ink layer. In this connection alcohols and aliphatic hydrocarbons have been found to be satisfactory and typical examples are as follows:- nonyl alcohol, 2-ethyl-n-butyl alcohol, white spirit and aliphatic solvents 20/2 and 17/4 manufactured by Carless Capel & Leonard. The solvents that can be used are not exclusively restricted to these types; for example mixtures of esters and aliphatics are also satisfactory.

Examples of pressure sensitive adhesive solutions are set out below:-

| 7. | Howstik 255 adhesive | 44% |
|---|---|---|
| | Polypale Resin rosin | 5% |
| | 2 ethyl-n-butyl alcohol | 51% |
| | | 100% |
| 8. | Gelva 263 adhesive | 40% |
| | Sucrose acetate isobutyrate | 20% |
| | Canless aliphatic 20/2 solvent | 40% |
| | | 100% |
| 9. | Swift K. 7503 adhesive | 56% |
| | Staybelite Ester 3 rosin | 5% |
| | Nonyl alcohol | 39% |
| | | 100% |
| 10. | Gelva 263 adhesive | 46.5% |
| | Staybelite Ester 3 rosin | 4.5% |
| | Butyl lactate | 19.0% |
| | White spirit | 30.0% |
| | | 100% |

A transfer constructed according to this invention may be used to apply in one operation, single layer or multilayer areas of conductive, resistive, insulating, dielectric, or semiconductive material or two or more of such layers to a heat resistant or other base. The conductive or resistive material incorporated in the printing media may include noble metals such as gold, silver, and platinum or alloys or compounds containing these metals and may subsequently be fired in air. However, such materials may contain other metals and their compounds, such as molybdenum, which may be subsequently fired in air or in an inert or reducing atmosphere, depending on the material involved. Alloys of molybdenum and manganese or metals or alloys of those metals occurring in Group VIII of the Periodic Table may also be used. Materials which may be applied in the above manner include cermet compositions or other materials suitable as semiconductors.

The resistor materials may consist of compounds such as oxides of any of the above mentioned metals alone, or alloyed with one or more of the metallic elements previously referred to.

The conductive or resistive materials may include bonding agents which may be of a silicious nature such as lead borosilicate or even silica. This does not, however, preclude the use of other bonding agents such as bismuth oxychloride and other materials.

Dielectric materials may contain any materials known in the art, for example, the titanates such as barium titanate. Dielectric materials modified with other materials such as bismuth titanate may also contain bonding agents as referred to when discussing resistors and conductive materials.

Insulating materials may comprise glass phase materials such as lead borosilicate and are available in two forms, namely, vitrifiable material, and a material which nucleates and crystallises on cooling.

Samples of semi-conducting materials are cadmium selenide and the sulphides of Cd, Pb, Zn and mixtures thereof.

The method described above of applying decorations and other designs to heat resistant bases offers a major advantage over current methods in that the transfer according to the invention may be applied to the base without the use of high pressure to activate the adhesive layer and moreover may be applied to surfaces which are uneven or have complex curvatures.

Another advantage lies in the fact that the transfer according to the invention may be applied directly to an unglazed biscuit without the necessity of sealing the pores of the ware with a primer beforehand.

With regard to the application of conductive or resistive or insulating or dielectric or semiconductive areas to heat resistant bases, these are generally printed on to a base in the form of a ceramic body such as a ceramic chip. It has therefore not always been possible to obtain an even deposition of ink due to the surface irregularities of the substrate. A self-adhesive transfer formed according to this invention overcomes this disadvantage.

The transfer offers the further advantage that a multilayer area may be applied in one operation instead of requiring a series of separate single layer applications as is currently necessary when direct printing.

By way of example, two transfers in accordance with the invention are shown in the accompanying drawing.

In the drawing, the several layers of the transfers are designated by reference numerals of which 1 represents a backing sheet, 2 and 3 represent polysiloxane release layers, 4 represents a design layer and 5 a high-tack pressure sensitive adhesive layer. When the transfers of the invention are required for decorating ceramic, glass and other ware, the design is a pictorial representation. However, as indicated previously, the design may comprise a resistive, conductive, semi-conductive, dielectric, or insulating material for use in making electrical components.

What is claimed is:

1. In a flexible, self-adhesive transfer for applying a design to a base, said transfer including a backing sheet, release layers, a design layer, and a layer of high tack pressure-sensitive adhesive, two or more transfers being adapted to be stacked one directly upon another prior to use, the improvements comprising:
   a. a backing sheet having oppositely facing first and second surfaces, a first of said surfaces being smoother than the second surface;
   b. a release layer on at least a part of each surface of said backing sheet, each release layer being of the same composition but of different relative smoothness, said first and second surfaces of the backing sheet imparting their respective difference in smoothness to the release layer thereupon;
   c. a design layer applied to the smoother release layer; and
   d. a layer of high tack, pressure-sensitive acrylic resin adhesive applied to the design layer, said transfer being adapted to be stacked with the adhesive layer in contact with the less smooth release layer of an adjacent transfer, said adhesive layer having a lower adhesion to the less smooth release layer than the adhesion of the smoother release layer to said design layer, thereby reducing blocking and rendering adjacent transfers separable.

2. A transfer according to claim 1, wherein each release layer comprises a polysiloxane material.

3. A transfer according to claim 2, wherein the polysiloxane material has the general formula $(R_2SiO)_n$ where R is a methyl group and n is a positive integer.

4. A transfer according to claim 3, wherein at least one methyl group is replaced by another alkyl group.

5. A transfer according to claim 2, wherein the backing sheet comprises one or more layers of flexible material selected from the group consisting of polyethylene and polyethylene/paper laminates.

6. A transfer according to claim 5, wherein the polyethylene has a density of between 0.92 and 0.935 gm/cm$^3$.

7. A transfer according to claim 1, wherein the design layer includes one or more layers of printing ink formulations comprising a pigment and a base selected from the group consisting of nitro cellulose, cellulose esters, modified rosin, alkyds, cyclic ketone condensates, maleics, amine, and acrylic resins.

8. A transfer according to claim 7, wherein the printing ink formulation includes a plasticiser.

9. A transfer according to claim 8, wherein the plasticiser is selected from the group consisting of di-octyl phthalate, di-butyl phthalate, and butyl phthalyl butyl glycollate.

10. A transfer according to claim 8, wherein the printing ink formulation includes a surfactant.

11. A transfer according to claim 10, wherein the surfactant is selected from the group consisting of stearic acid, glyceryl monostearate, and stearamide.

12. A transfer according to claim 7, wherein the printing ink formulation comprises 64.3 percent cadmium red ceramic enamel, 14.2 percent polybutyl methacrylate, 8.4 percent xylene, 9.5 percent amyl lactate, 1.8 percent di-octyl phthalate, and 1.8 percent stearamide.

13. A transfer according to claim 7, wherein the printing ink formulation comprises 61.5 percent lead antimony yellow ceramic enamel, 16.0 percent 2-ethyl hexyl acrylate, 18.8 percent amyl lactate, 1.9 percent butyl phthalyl butyl glycollate, and 1.8 percent stearic acid.

14. A transfer according to claim 7, wherein the printing ink formulation comprises 67.3 percent cobalt blue ceramic enamel, 13.5 percent polybutyl methacrylate/methyl methacrylate copolymer, 15.5 percent diacetone alcohol, 2.0 percent di-butyl phthalate, and 1.7 percent glyceryl monostearate.

15. A transfer according to claim 7, wherein the printing ink formulation comprises 18.0 percent isoindolinone yellow pigment, 36.0 percent polybutyl methacrylate, 18.0 percent xylene, 24.0 percent amyl lactate, 1.0 percent di-octyl phthalate, and 3.0 percent stearamide.

16. A transfer according to claim 7, wherein the printing ink formulation comprises 15.0 percent isoindolinone orange pigment, 40.5 percent 2-ethyl hexyl acrylate, 40.5 percent amyl lactate, 1.5 percent butyl phthalyl butyl glycollate, and 2.5 percent stearic acid.

17. A transfer according to claim 7, wherein the printing ink formulation comprises 10.0 percent phthalocyanine blue pigment, 43.5 percent polybutyl methacrylate/methyl methacrylate copolymer, 43.5 percent diacetone alcohol, 1.0 percent di-butyl phthalate, and 2.0 percent glyceryl monostearate.

18. A transfer according to claim 1, wherein the adhesive is an acrylic-vinylacetate copolymer.

19. a transfer according to claim 1, wherein the adhesive comprises 22.25 percent acrylic resin, 50 percent alcohol, 23.15 percent ethyl acetate, and 4.6 percent hexane.

20. a transfer according to claim 1, wherein the adhesive comprises 20.5 – 21.8 percent acrylic resin, 2.0 – 7.5 percent sucrose acetate iso-butyrate, 46.25 – 49.0 percent alcohol, 21.5 – 22.7 percent ethyl acetate, and 4.25 – 4.5 percent hexane.

21. A transfer according to claim 1, wherein the adhesive comprises 44 percent acrylic resin, 5 percent modifier, and 51 percent 2-ethyl-n-butyl alcohol.

22. A transfer according to claim 1, wherein the adhesive comprises 40 percent acrylic resin, 20 percent sucrose acetate iso-butyrate, and 40 percent aliphatic solvent.

23. A transfer according to claim 1, wherein the adhesive comprises 56 percent acrylic resin, 5 percent modifier, and 39 percent nonyl alcohol.

24. A transfer according to claim 1, wherein the adhesive comprises 46.5 percent acrylic resin, 4.5 percent modifier, 19.0 percent butyl lactate, and 30.0 percent white spirit.

25. A transfer according to claim 1, wherein the design layer is a conductive, resistive, insulating, dielectric or semiconductive material.

26. A transfer according to claim 25 wherein the conductive or resistive material is a noble metal, a metal from Group VIII of the Periodic Table, alloys, or compositions containing these metals.

27. A transfer according to claim 25, wherein the conductive or resistive material is an alloy of manganese and molybdenum.

28. A transfer according to claim 26, wherein the conductive or resistive material includes a bonding agent selected from the group consisting of silica, lead borosilicate, and bismuth oxychloride.

29. A transfer according to claim 25, wherein the dielectric material is a titanate.

30. A transfer according to claim 29, wherein the dielectric material is selected from the group consisting of barium titanate and bismuth titanate.

31. A transfer according to claim 30, wherein the dielectric material includes a bonding agent selected from the group consisting of silica and lead borosilicate.

32. A transfer according to claim 25, wherein the insulating material is a vitrifiable material or a material which nucleates and crystallizes on cooling.

33. A transfer according to claim 25, wherein the semiconductor material is selected from the group consisting of cadmium selenide, cadmium sulfide, lead sulfide, zinc sulfide, and mixtures thereof.

* * * * *

UNITED STATES PATENT OFFICE
CERTIFICATE OF CORRECTION

Patent No. 3,896,249      Dated July 22, 1975

Inventor(s)   Robert Alan Keeling & John Garrick Priest

It is certified that error appears in the above-identified patent and that said Letters Patent are hereby corrected as shown below:

(1) In the heading of the patent, on the front page thereof, immediately following item "[63]" ("Related U.S. Application Data"), insert:

--Claims priority, application Great Britain, Jan. 19, 1968, No. 3062/68.--.

(2) Col. 2, lines 52, 53, and 54, delete "is marketed by the Inveresk Paper Company of London Eng., and comprising" and insert in place thereof --comprises--.

Signed and Sealed this sixteenth Day of March 1976

[SEAL]

Attest:

RUTH C. MASON
*Attesting Officer*

C. MARSHALL DANN
*Commissioner of Patents and Trademarks*